July 24, 1923.
A. FEDERICCI
1,462,569
APPARATUS FOR MOLDING CEMENT BLOCKS
Filed Aug. 25, 1920   3 Sheets-Sheet 1
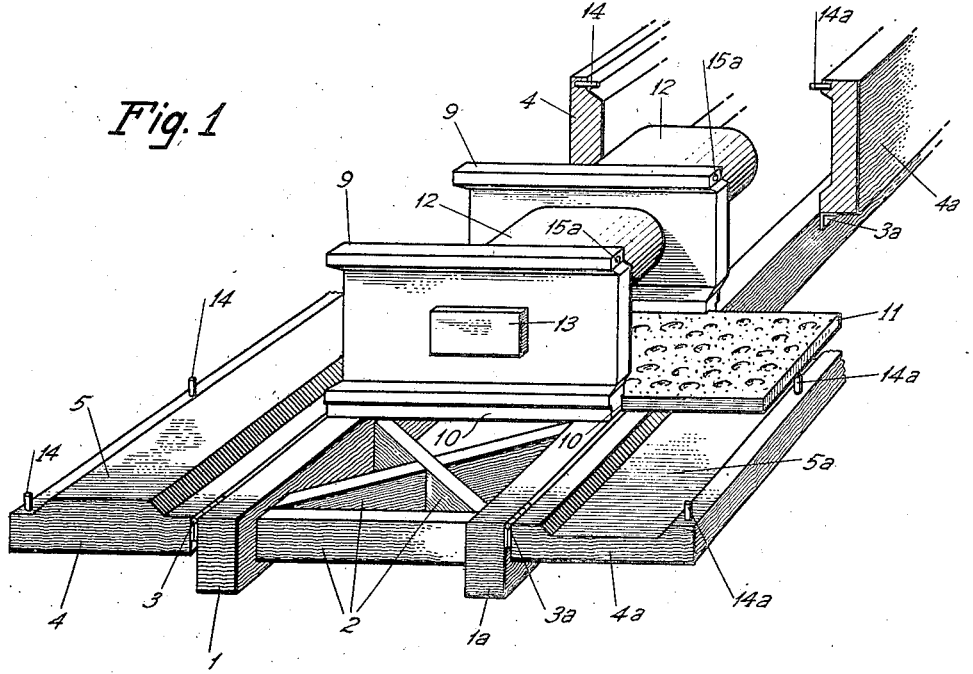
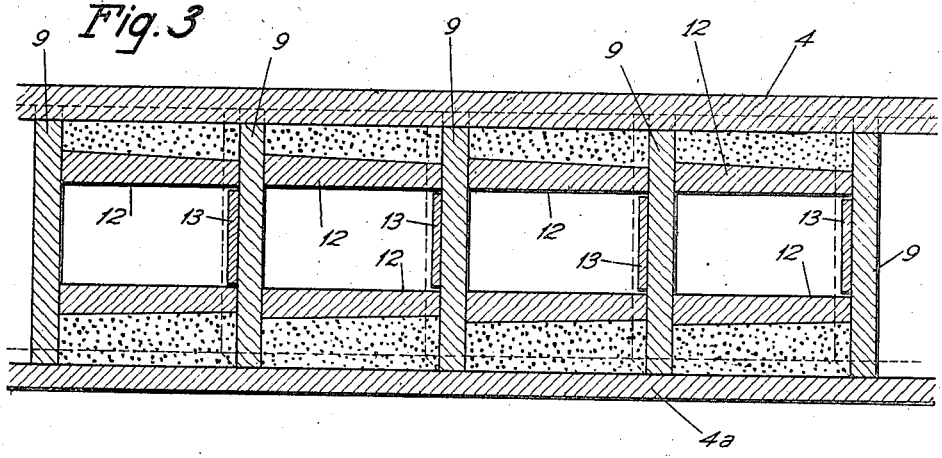
INVENTOR
Albert Federicci
BY Jas. H. Griffin
ATTORNEYS July 24, 1923.
A. FEDERICCI
1,462,569
APPARATUS FOR MOLDING CEMENT BLOCKS
Filed Aug. 25, 1920
3 Sheets-Sheet 2
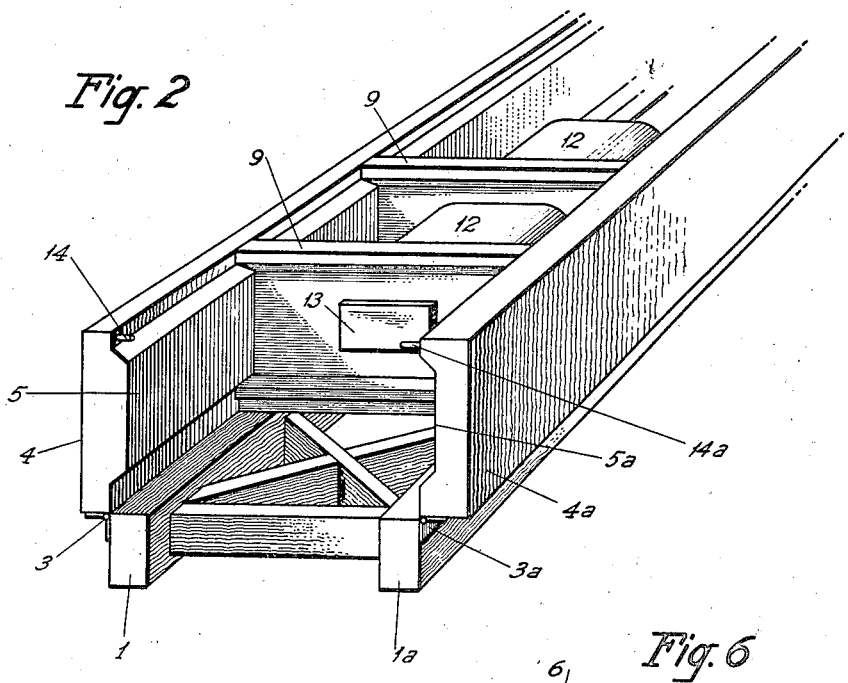
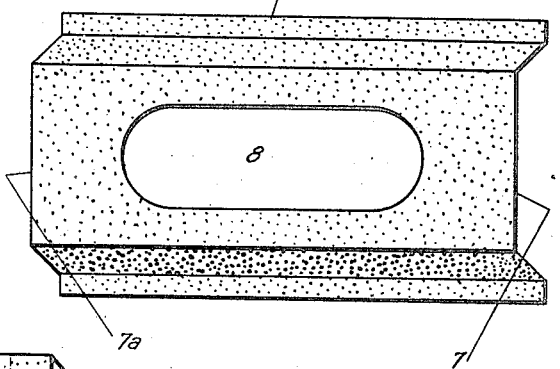
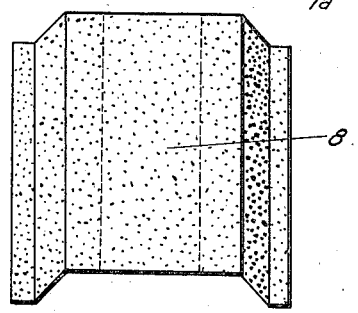
INVENTOR
Albert Federicci
BY Jas. H. Griffin
ATTORNEYS July 24, 1923.

A. FEDERICCI

APPARATUS FOR MOLDING CEMENT BLOCKS

Filed Aug. 25, 1920

INVENTOR
Albert Federicci
BY Jas. H. Griffin
ATTORNEYS

Patented July 24, 1923.

1,462,569

UNITED STATES PATENT OFFICE.

ALBERT FEDERICCI, OF PATERSON, NEW JERSEY, ASSIGNOR TO HENRY C. NEUBERGER, OF NEW YORK, N. Y.

APPARATUS FOR MOLDING CEMENT BLOCKS.

Application filed August 25, 1920. Serial No. 405,902.

*To the Commissioner of Patents:*

Be it known that I, ALBERT FEDERICCI, a citizen of the United States, residing at Paterson, in the county of Passaic and State of New Jersey, have invented a certain new and useful Apparatus for Molding Cement Blocks, of which the following is a specification.

This invention is an apparatus for molding cement blocks in a simple, economical and efficient way for the production of blocks in large numbers without variation in the sizes between the different blocks.

The primary object of the invention is to provide an apparatus which may be employed by unskilled labor for the production of blocks of uniform size, the apparatus being so constructed that the elements thereof cannot be improperly assembled.

An important feature of the invention resides in the fact that the blocks may be handled while "green" with a part of the form. In other words, at the conclusion of the molding operation, each block may be removed from the apparatus after it is slightly set and in a green state with a portion of the apparatus, which portion may be left associated with the block to permit of its safe and easy handling until the block is more or less weathered or hardened, with the result that the disadvantage of having to handle the blocks green and remove them in this condition from the forms, as is the case in prior machines, is entirely obviated here.

Another important feature of the invention resides in the provision of a mold unit of novel construction and so formed that a plurality of such units may be assembled in the apparatus to permit of the molding of a plurality of blocks through the movement of a minimum number of movable parts.

Features of the invention, other than those adverted to will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the invention.

Figure 1 is a perspective view illustrating the apparatus embodying the present invention. This view shows the manner of assembling the parts of the apparatus.

Figure 2 shows the parts assembled and ready for pouring a block.

Figure 3 is a horizontal central section taken through the apparatus, when the parts are in the positions shown in Fig. 2. In this figure, for the purpose of clearness, the apparatus is shown as having been charged with cement.

Figures 6 and 7 are views of the finished block, Fig. 6 being a plan view of the block, while Figure 7 is an end view thereof.

Figure 4:
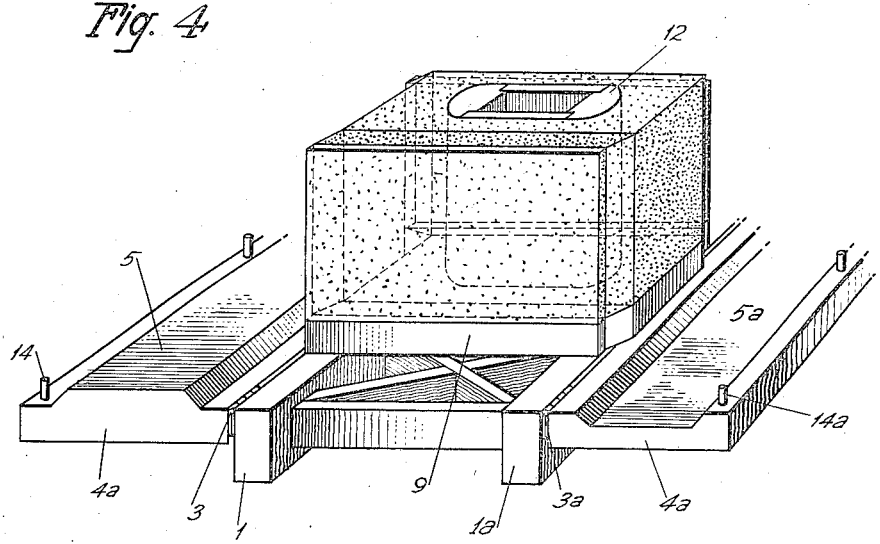
Figure 4 is a perspective view showing the block in finished condition and tilted up on the form on which it was cast, in a position to be removed from the apparatus.

In practising the present invention in its preferred form, the apparatus embodies a pair of sills 1 and 1$^a$, which sills may, if desired, be two by four positioned in parallel relation and suitably spaced apart and braced at 2. On these sills, the remaining portions of the apparatus are adapted to be supported, and for this reason the distance of the sills apart, over all, is made equal to the length of the form unit shown in Figure 5.

Extending longitudinally along the outer face of the sill 1 and hinged thereto at 3, is a wing or side board 4, which will hereinafter be termed the male wing, while similarly disposed with reference to the sill 1$^a$ is a female wing 4$^a$ hinged to the sill at 3$^a$. The male wing 4 derives its name from the longitudinal broad faced rib 5, which extends across its upper face and which is adapted to mold into the blocks 6 (see Fig. 6) formed in the apparatus a female channel 7 complementary to the male projection 7$^a$ formed at the other end of the block by the female channel 5$^a$ of the wing 4$^a$, so that in the finished block the opposite ends will be complementary. Blocks of this character may be laid end to end in a wall with the male and female portions interfitting with one another.

The mold unit, which is adapted to cooperate with the apparatus as thus far described, is shown in detail in Fig. 5 and the parts thereof will be described with reference to the position which they occupy relative to the finished tile shown in Figure 6, it being understood that the finished blocks are set in a wall in such position that the core hole 8 in the center thereof extends in a vertical direction.

Figure 5:
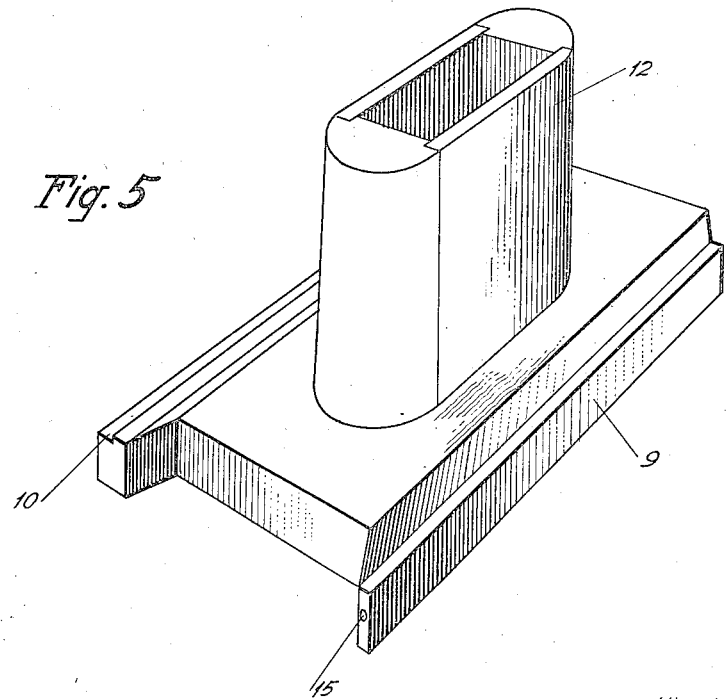
Figure 5 shows one of the form units in perspective.

Thus considered, a portion 9 of Figure 5 may be referred to as the bottom plate of the mold. This bottom plate is of a distinctive and novel formation. The upper face of the plate 9, as shown in Figure 5, is of male characteristics and is so formed that it will mold the lower face of the block as shown in Figure 7, while the bottom face has female characteristics complementary to the top face and is adapted to mold the upper face of the block as shown in Figure 7. It will be noted, however, from Figure 5 that one edge of the plate 9 is rabbeted at 10 to receive one edge of a face plate 11 (Figure 1), the purpose of which will be hereinafter more fully explained. The opposite ends of the plate 9 are made male and female complementary to one another and to the rib 5 of the wing 4 and the channel $5^a$ of the wing $4^a$.

Superimposed on the plate 9 is a rigid core 12 preferably slightly tapered to permit of proper draw and in the interest of lightness made hollow, while on the under side of the plate 9, as may be clearly noted from Figures 1 and 2, a centering projection 13 is formed. This centering projection is of a size substantially equal to the size of the hole in the core 12, so that if the end of the core of one mold is positioned against the back face of another mold of the same kind, the projection 13 will enter the core 12, after the manner shown in Figure 3 and will centralize the molds with respect to one another.

From what has been said with reference to the structural peculiarities of the present invention, the use of the apparatus for the molding of blocks will be apparent, but may be described in detail as follows.

When the wings 4 and $4^a$ turn down after the manner shown in the forward part of the perspective in Figure 1, a plurality of mold units, all of which are identical in form and of the kind shown in Figure 5 are laid on the sills 1 and $1^a$, as shown in this figure and are brought into a position wherein the open ends of the cores will fit over the centering projections 13. Any number of molds may be thus assembled on the sills, two being necessary to make one tile, with one added for every additional tile desired. After the molds are in place as shown, a face plate 11, hereinbefore referred to is slid in between each two molds as shown in Figure 1 and engages with the complementary rabbets. The upper face of each plate 11 will serve as the molding face for the face of the corresponding block, and, accordingly, said upper face of the face plate may be made smooth, stippled, ridged or otherwise configured in accordance with the desire for design or lack of it on the face of the finished block.

The face plates having all been positioned in place, the wings 5 are folded up into the positions shown in Figure 2, but it will be noted here that the marginal face of each wing carries spaced pins 14 on the wing 4 and $14^a$ on the wing $4^a$. These pins are adapted to enter complementary apertures 15 and $15^a$ in the ends of the plates 9 of the respective mold sections. The pins 14 are spaced at uniform distances apart along the wing 4 and the pins $14^a$ are correspondingly placed along the wing $4^a$, while the pins 14 and $14^a$ are juxtaposed with relation to one another.

The advantage of this construction is that, when the wings are folded up as described, and the pins caused to enter the holes in the mold sections, the entry of such pins will automatically space the successive plates 9 of the respective molds at uniform distances apart with great nicety and with perfect precision. This will result in so positioning the successive mold sections that the finished blocks will be identical in height with respect to one another, and there will not be the slightest variation, which, if present, would interfere with the proper assembling of successive tiers of blocks in building construction.

The parts having been assembled as shown in Figure 2, concrete, preferably quite soft, is poured into the apparatus and fills the spaces between the mold sections above the face plates 11 and between the wings 4 and $4^a$. It is smoothed off at the top of the apparatus by passing a straight edge along the upper edges of the wings and thereafter the concrete is left to set for a predetermined period.

At the expiration of a sufficient period to allow the blocks to set, suitable means which hold the wings in upfolded positions are released and the wings are allowed to drop into divergent relation, shown in Figure 4, whereupon the mold sections are tilted up after the manner shown in Figure 4, with the blocks thereon, and these mold sections may be picked up and removed with the block to a suitable drying or curing place, where the green blocks are left positioned on the mold sections for a sufficient period to weather or cure. At the expiration of which time, the sections, with the blocks thereon, are tilted over into an inverted position from that shown in Figure 4, and the molds are removed from the blocks, leaving the blocks in finished condition and ready, after further cure, for use.

A marked practical advantage in the manipulation of blocks as described is that a workman does not find it necessary to touch the block when it is removed from the apparatus or at any time until it is at least partially cured, but is enabled to move the block from place to place by leaving the mold with the block thereon. This method of handling concrete blocks greatly minimizes breakage, distortion or checking of the blocks and results in the production of perfect blocks during the practical operation of the apparatus.

Having thus fully described the invention, what I claim as new and desire to secure by Letters Patent is:

1. An apparatus for molding blocks embodying a rigid base member or platform, wings extending longitudinally along the platform and pivoted to each lateral edge thereof, said wings being foldable into upstanding parallel position to form an elongated mold cavity, a plurality of partitions supported on the platform and extending transversely between the wings, each partition being provided with a core member mounted on said partition and of such length that it will bear against the contiguous face of the next partition for the purpose of accurately spacing the partitions apart and forming between the successive partitions mold sections, and a face plate positioned between each partition and supported by the platform.

2. An apparatus for molding blocks embodying a rigid base or platform along the longitudinal edges of which are pivoted wings, each of which is adapted to cast one face of each of several blocks, a plurality of mold units positioned on the platform between the wings and forming partitions between successive blocks, one face of each partition having a male projection and the other face of each of said partitions having a complementary female depression, and a core member carried by each partition and of such length that its free end will abut the adjacent face of the next partition for the purpose of accurately spacing said partitions apart.

3. An apparatus for molding blocks embodying a rigid base or platform along the longitudinal edges of which are pivoted wings, each of which is adapted to cast one face of each of several blocks, a plurality of mold units positioned on the platform between the wings and forming partitions between successive blocks, one face of each partition having a male projection and the other face of each of said partitions having a complementary female depression, a core member carried by each partition and of such length that its free end will abut the adjacent face of the next partition for the purpose of accurately spacing said partitions apart, face plates positioned between each two partitions and supported on the platform for accurately spacing the lower edges of the several partitions apart, apertures in each partition and near the upper edge thereof, and pins carried by the wings and adapted to enter the depressions in the several partitions to accurately space the upper edges of the partitions apart.

In testimony whereof, I have signed my name to this specification.

ALBERT FEDERICCI.